United States Patent [19]

Conn et al.

[11] Patent Number: 5,692,300
[45] Date of Patent: Dec. 2, 1997

[54] METHOD FOR FORMING ALUMINUM TUBES AND BRAZING A LOCKSEAM FORMED THEREIN

[75] Inventors: Paul Joseph Conn, Grand Island; Gary Asel Halstead, Lockport, both of N.Y.

[73] Assignee: S. A. Day Manufacturing Co., Inc., Buffalo, N.Y.

[21] Appl. No.: 423,340

[22] Filed: Apr. 17, 1995

[51] Int. Cl.[6] .................................................. B23P 15/00
[52] U.S. Cl. .............................. 29/890.053; 29/890.054
[58] Field of Search .................... 29/890.045, 890.054, 29/890.053; 228/183, 248, 217, 263.17

[56] References Cited

U.S. PATENT DOCUMENTS

| | | | |
|---|---|---|---|
| 4,024,619 | 5/1977 | Jonason | 29/157.3 R |
| 4,558,695 | 12/1985 | Kumazawa et al. | 228/183 |
| 5,105,540 | 4/1992 | Rhodes | 29/890.043 |
| 5,172,476 | 12/1992 | Joshi | 29/890.053 |
| 5,185,925 | 2/1993 | Ryan et al. | 29/890.049 |
| 5,251,374 | 10/1993 | Halstead et al. | 29/890.047 |
| 5,295,302 | 3/1994 | Takai et al. | 29/890.039 |

*Primary Examiner*—Irene Cuda
*Attorney, Agent, or Firm*—Gary M. Hartman; Domenica N. S. Hartman

[57] ABSTRACT

An improved method is provided for producing an aluminum tube of the type used as cooling tubes for heat exchangers, and particularly automotive heat exchangers. The method utilizes a flux-containing composition that can be selectively deposited in a manner that permits the manufacture of aluminum tubes having a lockseam construction. As a result, the method made possible by this invention provides for the manufacture of heat exchanger tubes that offer the weight, durability and safety advantages of aluminum alloy construction, but at lower investment, processing and material costs as compared to prior art welded aluminum tubes. Another advantage of the present method is that minimal amounts of braze alloy and flux are required, yet uniform and consistent brazed joints can be produced to yield leak-proof brazed assemblies.

16 Claims, 2 Drawing Sheets

METHOD FOR FORMING ALUMINUM TUBES AND BRAZING A LOCKSEAM FORMED THEREIN

BACKGROUND OF THE INVENTION

1. Field of the Invention

The present invention relates to an improved method for forming aluminum tubes and joining such tubes to a second member, such as for the purpose of manufacturing and assembling heat exchangers of the type used in the automotive industry. More particularly, this invention relates to an improved technique for forming aluminum tubes for a heat exchanger, wherein a relatively low-cost lockseam design is employed in conjunction with a flux-brazing compound to produce a liquid-tight tube from aluminum flat stock.

2. Description of the Prior Art

Heat exchangers are routinely employed within the automotive industry, such as in the form of radiators for cooling engine coolant, condensers and evaporators for use in air conditioning systems, and heaters. In order to efficiently maximize the amount of surface area available for transferring heat between the environment and a cooling fluid flowing through the heat exchanger, the design of the heat exchanger is typically of a tube-and-fin type, such as the tube-and-center type heat exchanger illustrated in FIG. 1. The heat exchanger 10 is shown as having a number of flat-type cooling tubes 12 between a pair of opposing tanks 16 and 18, and high surface area fins 14 in thermal contact with the tubes 12. The fins 14 enhance the ability of the heat exchanger 10 to transfer heat from the cooling fluid flowing through the tubes 12 to the environment, or vice versa.

In the past, automotive heat exchangers were of copper/brass construction, with the individual components of a heat exchanger being joined by a lead/tin solder. An economical construction for a brass tube 12 of the type shown in FIG. 1 is represented in FIG. 2a. The robe 12 has an oblong cross-section, i.e., characterized by a first cross-sectional diameter that is less than and transverse to a second cross-sectional diameter. A lockseam 20 is formed at one side of the tube 12 corresponding to the smaller cross-sectional diameter. The lockseam 20 is produced by forming the tube 12 from flat stock of the desired brass material. The flat stock is coated with a suitable solder alloy from which a fluid-tight lockseam solder joint 22 is formed following a suitable furnace operation. The flat stock is sized to have an elongate shape, and is then rolled so that its opposing lateral edges 20a and 20b are folded over each other in the manner shown in FIG. 2a. FIG. 2a illustrates the appearance of the tube 12 after the furnace operation in which the temperature of the robe 12 is raised above the melting temperature of the solder alloy, but below the melting temperature of the tube material.

For reasons of weight, durability, and concerns regarding the use of a tin/lead solder, the automotive heat exchanger industry has gradually converted to an aluminum alloy construction. Such heat exchangers are conventionally formed with clad aluminum alloy components, in which the cladding material is an aluminum-silicon eutectic brazing alloy, such as AA 4045, AA 4047 and AA 4343 aluminum alloys (AA being the designation given by the Aluminum Association). Such silicon-rich braze alloys have a lower melting temperature than the base aluminum alloy, which is often AA 3003, having a nominal chemistry of about 1.2 weight percent manganese, with the balance being substantially aluminum. Tubes formed from such materials are routinely referred to as aluminum tubes, and will be referred to as such hereinafter, though such terminology generally encompasses tubes made from aluminum and its alloys. Typically, the cladding constitutes about seven to ten percent of the base metal thickness, which provides a sufficient amount of braze alloy to form fluid-tight brazements when the assembled components are heated to a temperature above the melting temperature of the cladding, but below the melting temperature of the base aluminum alloy.

Aluminum heat exchanger tubes are often extruded so as to be seamless, while an alternative method is to weld strips of aluminum flat stock, producing a tube 112 as illustrated in FIG. 2b. As noted above, the tubes of an aluminum heat exchanger are often clad, such that the tubes provide the braze alloy for forming brazements between the tubes and fins and between the tubes and tanks. Since converting to the use of aluminum, the heat exchanger industry has been discouraged from using the traditional lockseam design because corrosion resistant alloys were not initially available. The use of a heavier gage stock, e.g., about 0.0135 inch (about 0.34 millimeter) required for reliably obtaining a suitable weld joint, reduced the corrosion problem because longer heat exchanger life was promoted with the presence of a thicker tube wall. As a result, thicker gage aluminum stock became the norm for the heat exchanger industry. In contrast, a lockseam at such gage thicknesses was not efficient in terms of material usage when compared to a welded design because of the extra material required to form the lockseam. Also, the norm for brazing was vacuum brazing and, as can be appreciated from FIG. 2a, the cavity formed between the edges 20a and 20b could not be filled with braze clad alloy because vacuum brazing does not promote large fillets and good flow, two characteristics essential to the use of a lockseam design.

FIG. 2b represents the configuration in which a flat-type tube 112 is formed by rolling a strip of aluminum flat stock, and forming a weld 120 between the abutted longitudinal edges of the flat stock. The welded tube 112 design is much more expensive to manufacture than the lockseam tube 12 represented in FIG. 2a. Reasons for this include the complicated welding technology required to form the weld, necessitating a very high equipment investment. In addition, in order to achieve a quality weld, the flat stock strip speed must be several hundred feet per minute, making this manufacturing method suitable only for mass production. Another disadvantage is the use of clad aluminum stock, which has a relative high cost, and is typically sold under the condition of large purchases with long lead times. Yet another shortcoming is that the minimum gage for clad aluminum flat stock for welded tubes is 0.0125 inch (about 0.3175 millimeter), compared to 0.005 inch (about 0.127 millimeter) for brass tubing. The above factors have generally caused lower-volume heat exchanger manufacturers to either cease heat exchanger production or purchase expensive clad aluminum material, resulting in such manufacturers becoming noncompetitive or operating at a reduced profit margin.

Alternative methods for manufacturing heat exchanger tubes from clad aluminum alloy flat stock have been suggested, such as those taught by U.S. Pat. No. 5,185,925 to Ryan et al. and U.S. Pat. No. 5,295,302 to Takai et al. However, shortcomings of the teachings of Ryan et al. include a labor intensive process and the required use of a costly progressive die, while the configuration taught by Takai et al. has the tendency for leak paths at the tube and header joint due to the presence of what are described as side edge projections. Both of these teachings have the problem of requiring clad aluminum on either one or both sides of the flat stock, which adds undesirable cost and weight to the heat exchanger assembly.

From the above, it is apparent that it would be desirable to provide a method for manufacturing heat exchanger tubes that offer the weight, durability and safety advantages of aluminum alloy construction, but makes possible the manufacture of aluminum tubing at lower investment, processing and material costs as compared to prior art welded aluminum tubes. Such a method would preferably entail minimal amounts of braze alloy and flux, yet promote uniformity and consistency of the brazed joints to yield leak-proof brazed assemblies.

SUMMARY OF THE INVENTION

It is an object of this invention to provide a method for producing an aluminum tube that is suitable for use as a cooling tube for a brazed heat exchanger unit.

It is a further object of this invention that such a method enable the use of aluminum flat stock to produce an aluminum tube without requiring expensive welding equipment and its associated operating costs.

It is another object of this invention that such a method eliminate the requirement for producing heat exchanger tubes and assembling heat exchanger with components that are clad with a brazing alloy, thereby enabling the use of thinner-gage aluminum stock.

It is yet another object of this invention that such a method eliminate the requirement for applying excessive amounts of flux on the heat exchanger components for the purpose of enhancing brazeability.

It is still a further object of this invention that the method entail the use of a flux-containing composition that promotes complete and consistent brazing and high integrity braze joints, and minimizes the number of defective assemblies due to leaky internal joints.

In accordance with a preferred embodiment of this invention, these and other objects and advantages are accomplished as follows.

According to the present invention, an improved method is provided for producing an aluminum tube of the type used as cooling tubes for heat exchangers, and particularly automotive heat exchangers. The method utilizes a flux-containing composition that can be selectively deposited in a manner that permits the manufacture of aluminum tubes having a lockseam construction. As a result, the method made possible by this invention provides for the manufacture of heat exchanger tubes that offer the weight, durability and safety advantages of aluminum alloy construction, but with lower investment, processing and material costs as compared to prior art welded aluminum tubes. Another important aspect of the present method is that minimal amounts of braze alloy and flux can be used, yet uniform and consistent brazed joints are formed to yield leak-proof brazed assemblies.

According to one embodiment of this invention, an unclad aluminum flat stock having oppositely disposed longitudinal edges undergoes a forming operation, in which a flat-type tube is produced having a longitudinally-oriented lockseam formed by the longitudinal edges of the flat stock. Thereafter, a preferably nonaqueous flux-brazing composition is deposited on at least the lockseam of the tube. The flux-brazing composition is composed of a flux material, an aluminum-silicon powder and a binder, which cooperate to crack and displace aluminum oxides on the aluminum alloy and form a high quality brazement during brazing. The tube is then heated for a duration that is sufficient to melt the flux-brazing composition and thereby braze the lockseam to form a leak-proof seal.

In an alternative embodiment, the method of this invention entails the use of aluminum flat stock, on which a substantially nonaqueous flux-containing composition is deposited on opposite surfaces of the flat stock along one of its longitudinal edges. The flat stock is then rolled so as to form a flat-type tube having a longitudinally-oriented lockseam formed by overlapping portions of the flat stock's longitudinal edges. As a result, the flux-containing composition is disposed between the overlapping portion. The tube is then heated for a duration that is sufficient to melt the flux-containing composition and thereby braze the lockseam to form a leak-proof seal.

With either method, the resulting heat exchanger tube is characterized by a longitudinally-oriented lockseam formed by overlapping portions of the longitudinal edges of the aluminum flat stock, in which the lockseam includes a brazement between the overlapping portions so as to form a leak-proof seal. Typically, the heating step will be performed alter a tube formed in accordance with this invention have been assembled with other components of a heat exchanger assembly, such that the lockseam brazement is formed simultaneously with the brazements that join the tubes with a pair of tanks and a number of fins.

As can be appreciated from the above, an advantage to the present invention is that an economical method is provided for producing an aluminum tube that is suitable for use as a cooling tube for a brazed heat exchanger unit. In particular, the method enables the use of aluminum flat stock to produce an aluminum tube without requiring expensive welding equipment and its associated operating costs. As such, the method of this invention overcomes significant shortcomings of prior art welded aluminum tubes of the type used in the heat exchanger industry, enabling the manufacture of less expensive aluminum tubes by lower-volume manufacturers. These advantages are realized while achieving the desirable weight and durability advantages associated with aluminum tubes.

Another advantage of this invention is that the method eliminates the requirement for producing heat exchanger tubes and assembling heat exchanger with components that are clad with a brazing alloy. As such, thinner-gage aluminum stock can be used, thereby significantly reducing the weight of the tubes and the heat exchanger assembly. The method is also advantageous because it minimizes the amount of flux necessary to crack and displace aluminum oxides on the heat exchanger components for the purpose of enhancing brazeability. More specifically, the preferred flux-containing composition employed by this invention can be selectively deposited on the tubes in mounts that do not significantly exceed that required to produce the desired fluxing action. The flux-containing composition promotes complete and consistent brazing and high integrity braze joints, so as to minimize the number of defective assemblies due to leaky internal joints.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 4b shows in cross-section an aluminum tube having a lockseam immediately after being formed from the flat stock shown in FIG. 4a.

DETAILED DESCRIPTION OF THE PREFERRED EMBODIMENT

An improved method is provided for producing aluminum alloy heat exchanger tubes and, as such, for assembling and brazing a heat exchanger which is suitable for automotive applications, such as radiators for cooling engine coolant, condensers and evaporators for use in air conditioning systems, and heaters. The method of the present invention utilizes aluminum flat stock and a flux-containing composition that is particularly adapted to be selectively deposited, making possible the manufacture of a relatively inexpensive heat exchanger tube from the aluminum flat stock.

Figure 1:
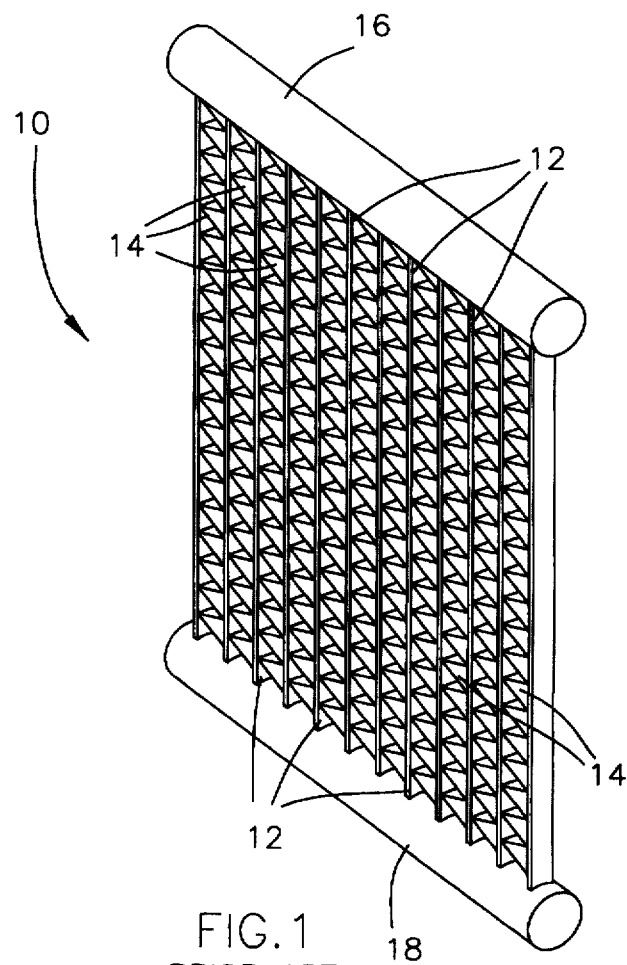
FIG. 1 is a perspective view of a heat exchanger of a type known in the prior art.

FIG. 1 is a perspective view of a conventional tube-and-center type heat exchanger unit 10 that can be manufactured in accordance with the improved method of this invention. The tube-and-center design illustrated in FIG. 1 is preferred for automotive applications, in that the design maximizes the amount of surface area that is in contact with incoming air. The air is forced around the high surface area provided by the finned centers 14 located between adjacent pairs of heat exchanger tubes 12, providing for a high heat exchange rate between the air and a suitable fluid which flows through the tubes 12. The tubes 12 are oriented to be geometrically in parallel with each other as well as hydraulically in parallel between a pair of reservoir tanks 16 and 18.

Figure 2A:
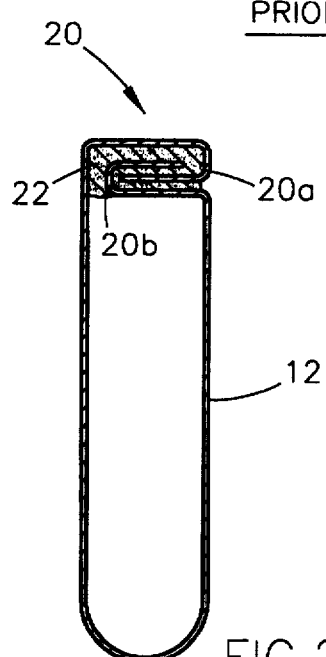
FIG. 2a shows in cross-section a brass cooling tube formed with a lockseam in accordance with the prior art.
Figure 2B:
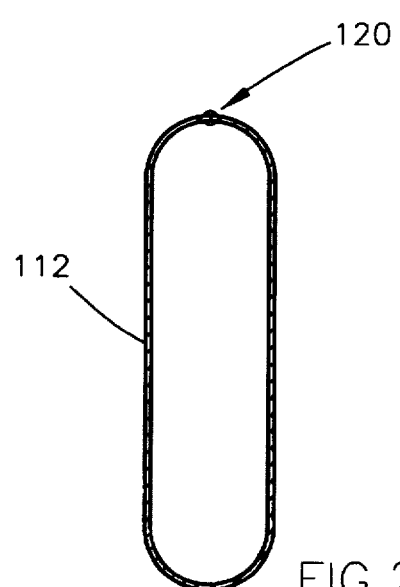
FIG. 2b shows in cross-section a welded aluminum alloy cooling tube in accordance with the prior art.
Figure 3A:
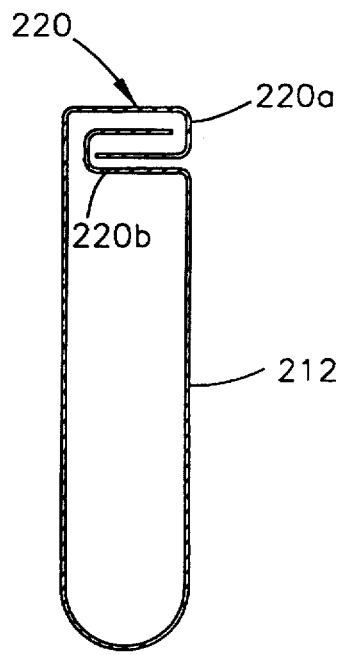
FIG. 3a shows in cross-section an aluminum tube formed in accordance with a first embodiment of this invention.
Figure 3B:
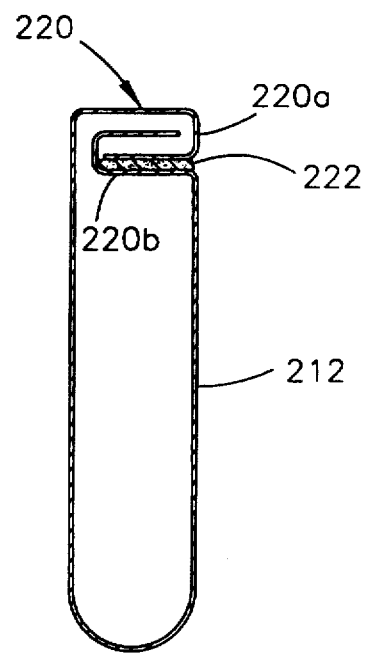
FIG. 3b shows in cross-section the aluminum tube of FIG. 3a after a flux-brazing composition is deposited within the lockseam and the tube has undergone a brazing operation, in accordance with this invention.

Shown in greater detail in FIGS. 3a and 3b is a cross-section of a flat-type tube 212 fabricated in accordance with this invention. As with prior art tubes, such as the tube 112 shown in FIG. 2b, the tube 212 is formed from a suitable aluminum alloy, such as AA 3003. In contrast to prior art tubes, which are generally formed as extrusions or welded tubes, the tube 212 shown in FIGS. 3a and 3b is formed from flat stock to have the cross-sectional shape shown. A primary feature of the tube 212 is a longitudinal lockseam 220 formed from the longitudinal edges 220a and 220b of the flat stock so as to be situated along a narrow side of the tube 212. Another feature of the tube 212 is that the flat stock from which the tube 212 is formed can be as thin as about 0.003 inch (about 0.076 millimeter) in thickness, though flat stock having a thickness of up to about 0.030 inch (about 0.76 millimeter) can be readily employed.

A further feature is that the flat stock is not clad with a braze alloy, such that the overall thickness and weight of the tube 212 is further reduced from that previously required for aluminum alloy heat exchanger tubes. As a result, the thickness of the flat stock from which the tube 212 can be formed, and therefore the wall thickness of the tube 212, can be significantly less than the thickness of prior art aluminum tubes, which are generally limited to a minimum thickness of at least about 0.125 inch (about 0.3175 millimeter).

FIG. 3a illustrates the tube 212 prior to undergoing a brazing operation in which a brazement 222, shown in FIG. 3b, is formed at the lockseam 220 in order to form a fluid-tight seal. In accordance with the teachings of this invention, the brazement 222 is formed by depositing a flux-brazing composition that can be selectively deposited at the lockseam 220. A preferred flux-brazing composition is taught in U.S. Pat. No. 5,251,374 to Halstead et al., and is composed of a mixture of a flux compound, an aluminum-silicon braze alloy powder and a zinc powder held together with a suitable binder. Preferably, the flux compound is potassium tetrafluoroaluminate ($KAlF_4$). A preferred composition contains about 10 to about 50 weight percent of the potassium tetrafluoroaluminate, about 2 to about 13 weight percent silicon, about 0.5 to about 3 weight percent of zinc or another metal whose electrode potential is less than the electrode potential of the tube's aluminum alloy, and about 0.1 to about 2 weight percent of an organic binder, such as hydroxypropyl cellulose binder, with the balance being aluminum particle.

The preferred flux-brazing composition is characterized by having a paste-like consistency, so as to be sufficiently viscous to adhere well to the tube 212 and lockseam 220, while also being sufficiently fluid so as to promote handling and deposition of the composition. Notably, the flux-brazing composition does not contain water, and therefore does not serve as a source for water that would otherwise adversely affect braze joint quality. Finally, the use of the preferred flux-brazing composition in the practice of the present invention is significant in terms of overcoming barriers to the use of lockseam aluminum tubes in the prior art. Problems associated with inadequate corrosion resistance are solved due to the presence of zinc in the flux-brazing composition, thereby enabling the use of thinner flat stock than that previously possible. Furthermore, the preferred flux-brazing composition eliminates the prior art requirement for using clad aluminum materials that, as noted previously, incur a significant weight penalty due to the presence of the lockseam. Finally, use of the flux-brazing composition taught by Halstead et al. is compatible with controlled atmosphere brazing (CAB) methods, which overcome the problems of inadequate braze alloy flow associated with vacuum brazing techniques.

After drying, the preferred flux-brazing composition hardens to form a highly adherent coating that permits the tube 212 to be readily handled without concern for the loss of flux during the subsequent assembly and brazing of a heat exchanger. Consequently, the entire tube 212 can be coated with a controlled amount of the preferred flux-brazing composition, which is then dried to permit assembly of the tube 212 with its corresponding fins (and headers if the design requires) prior to brazing. This approach enables the flux-brazing composition to melt and braze the tube 212 to its fins, while eliminating the conventional requirement for a dry oven and a core fluxer, both of which require large, energy intensive facilities in order to handle the entire heat exchanger core. Instead, the flux-brazing composition provides the flux and braze alloy required for brazing, while separately fluxing and drying the tubes 212 eliminates the requirement for a large core dry oven.

Alternatively, the preferred flux-brazing composition can be deposited in controlled mounts on the entire heat exchanger prior to brazing. For this purpose, the heat exchanger is fixtured and sprayed with the flux-brazing composition so as to cover the tubes 212, tube lockseam 220, fins, and the tube-to-tank (or tube-to-header) joint. The entire assembly is then preferably dried at about 150° C. to about 425° C., and then brazed in a controlled atmosphere. A preferred braze atmosphere is nitrogen with a free oxygen level of less than about 100 ppm and a dewpoint of about −40° C. Brazing is preferably carded out at a temperature of about 575° C. to about 620° C., which is sufficient to cause the silicon-rich alloy in the flux-brazing composition to melt and seal each lockseam 220 and tube-to-tank joint, and to bond the tubes to their corresponding fins. Upon cooling to ambient, the result is a monolithic aluminum heat exchanger that advantageously requires no further post treatment.

As noted above, FIG. 3b illustrates the appearance following brazing of the tube 212 produced in accordance with this invention. Notably, the lockseam 220 has a thickness of about four times that of the flat stock from which the tube 212 is formed. As a result, the lockseam 220 is particularly resistant to rupture and impact from stones and other debris encountered on the road. To exploit this aspect, tubes 212 manufactured in accordance with this invention can be assembled such that their lockseams 220 are oriented in the same direction when assembled within a heat exchanger, and in a direction which is exposed to the likely impact from debris once the heat exchanger is installed in an automobile. Additional protection could be achieved by forming the tubes 212 from a thicker clad aluminum flat stock, though the advantages of material selection, including availability, cost and lower weight would be lost.

Figure 4A:
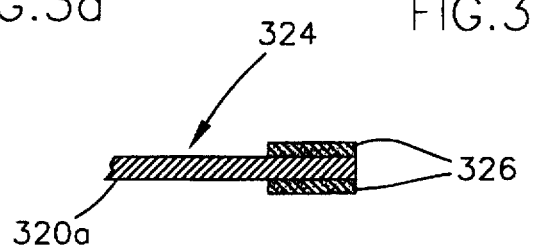
FIG. 4a is a cross-sectional view of a longitudinal edge of an aluminum flat stock on which has been deposited a flux-brazing composition in accordance with a second embodiment of this invention.
Figure 4B:
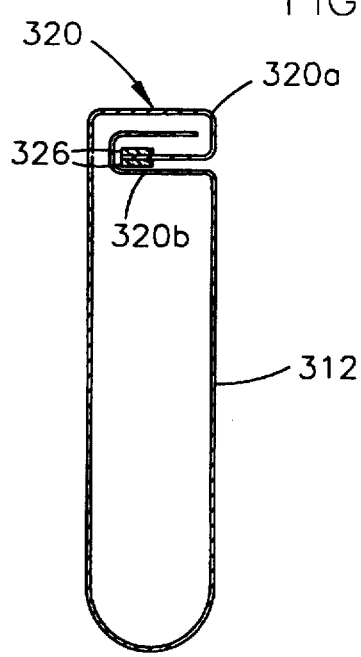
Figure 4C:
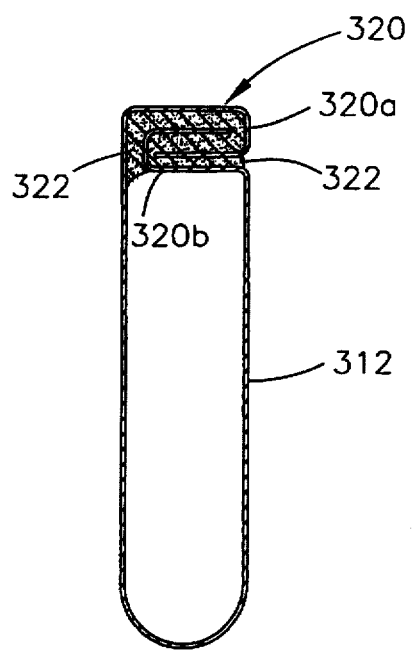
FIG. 4c shows in cross-section the aluminum tube of FIG. 4b after completion of a brazing operation in which the flux-brazing composition forms a brazement with the lockseam.

FIGS. 4a through 4c illustrate an alternative embodiment of the method of this invention. As shown in FIG. 4a, the preferred flux-brazing composition 326 can be deposited on opposite surfaces of an aluminum flat stock 324 along one edge 320a of its pair of longitudinal edges, and then dried such that the flux-brazing composition 326 tenaciously adheres to the flat stock 324. The flat stock 324 can then be rolled to form a flat-type tube 312 having a lockseam 320 as shown in FIG. 4b, with the flux-brig composition being disposed between overlapping portions of the opposite edge 320b of the flat stock 324. The advantage of this approach is that, after undergoing a brazing operation such as that described above, the brazement 322 formed by the flux-brazing composition is more reliably distributed throughout the entire lockseam 320, as shown in FIG. 4c. In practice, suitable brazements 322 have been produced by depositing the flux-brazing composition to cover an approximately six millimeter wide band along the edge 320a of the flat stock 324, with a suitable thickness for the flux-brazing composition being about 0.05 to about 0.25 millimeter, though it is foreseeable that lesser or greater amounts of the flux-brazing composition could be deposited.

The method described above can be modified to use a clad aluminum flat stock and a special flux-containing composition that can deposited on the longitudinal edge 320a of the flat stock 324 in the same manner as that shown in FIG. 4a. In the past, lockseams of the type shown in the Figures would prevent flux penetration into the lockseam, resulting in inadequate oxide removal during the brazing cycle. However, an essentially metal-free flux composition disclosed in copending U.S. Pat. Ser. No. 08/203,012, assigned to the assignee of the present invention, is particularly well suited for being selectively deposited on and adhering to the edges 320a and 320b of a clad aluminum flat stock 324. The result is that the flux is held in position within the lockseam 320 before brazing, with a clearance of about ten to fifty micrometers, though as much as about 100 to about 250 micrometers, being typically present between the edges 320a and 320b forming the lockseam 320. At just below braze temperature (about 560° C.) the flux melts, thereby permitting capillary action to pull the flux from the lockseam 320 via the clearance, displacing oxides in its path. This is followed by the melting of the cladding and filling of the voids of the lockseam 320 left by the flow of the flux.

Regardless of which of the above methods are employed, aluminum alloy heat exchangers manufactured in accordance with this invention are characterized by a flat-type tube construction in which a longitudinally-oriented lockseam is formed by the overlapping longitudinal edges of an aluminum flat stock from which the tubes are formed. The flat stock is preferably, though not necessarily, unclad in order to minimize the weight and cost of the tubes. The lockseam includes a brazement between the overlapping edges so as to form a leak-proof seal. Advantageously, the flat stock can have a thickness of less than about 0.3175 millimeter, and the lockseam has a thickness of about four times that of the flat stock. In addition, the lockseam is preferably formed at a side of the tube corresponding to the smaller cross-sectional diameter of the flat-type tube.

From the above, it can be seen that a particularly advantageous feature of this invention is that an economical method is provided for producing an aluminum heat exchanger tube. In particular, the method enables the use of aluminum flat stock to produce a tube without requiring expensive extrusion methods or welding equipment and their associated operating costs. As such, the method of this invention overcomes significant shortcomings of prior art welded aluminum tubes of the type used in the heat exchanger industry, enabling the manufacture of less expensive aluminum tubes by lower-volume manufacturers. These advantages are realized while achieving the desirable weight and durability advantages associated with aluminum tubes.

In addition, the method of this invention eliminates the conventional requirement for producing heat exchanger tubes and assembling heat exchanger with components that are clad with a brazing alloy. As such, aluminum stock having a thickness of as little as about 0.003 inch (about 0.076 millimeter) can be used, thereby significantly reducing the weight of the tubes and the heat exchanger assembly. The avoidance of requiring clad aluminum alloys is particularly advantageous for low-volume manufacturers in that such manufacturers are not compelled to make large quantity purchases of a more expensive material. Accordingly, the weight, durability and safety advantages of aluminum alloy construction are achieved by this invention, but at lower investment, processing and material costs as compared to prior art welded aluminum tubes.

Another advantage of this invention is that the method enables the use of a minimal amount of flux necessary to crack and displace aluminum oxides on the lockseam and the tubes for the purpose of enhancing brazeability. More specifically, the preferred flux-brazing composition employed by this invention is adapted to be selectively deposited on the tubes in amounts that do not significantly exceed that required to produce the desired fluxing action. The brazing composition promotes complete and consistent brazing and high integrity braze joints, so as to minimize the number of defective assemblies due to leaky internal joints.

While our invention has been described in terms of a preferred embodiment, it is apparent that other forms could be adopted by one skilled in the art. For example, the preferred quantities of the individual constituents of the flux composition could be modified, the cross-sectional shape of the heat exchanger tube could differ from that shown in the Figures and yet allow the formation of a lockseam, and the processing steps and heat exchanger design could differ from those described. Accordingly, the scope of our invention is to be limited only by the following claims.

The embodiments of the invention in which an exclusive property or privilege is claimed are defined as follows:

1. A method for manufacturing an aluminum alloy heat exchanger tube, the method comprising the steps of:

providing an unclad aluminum alloy flat stock having oppositely disposed longitudinal edges;

rolling the flat stock so as to form a flat-type tube having a longitudinally-oriented lockseam formed by the longitudinal edges of the flat stock;

depositing a flux-brazing composition on at least the lockseam of the tube, the flux-brazing composition comprising a flux material, an aluminum-silicon powder and a binder; and heating the tube for a duration that is sufficient to melt the flux-brazing composition and thereby braze the lockseam to form a leak-proof seal.

2. A method as recited in claim 1 wherein the rolling step causes the lockseam to have a thickness of about four times that of the flat stock.

3. A method as recited in claim 1 wherein the rolling step causes the tube to have a first cross-sectional diameter that is less than and transverse to a second cross-sectional diameter, and wherein the lockseam is formed at a side of the tube corresponding to the first cross-sectional diameter.

4. A method as recited in claim 1 wherein the flux-brazing composition consists essentially of:

from about 10 to about 50 weight percent of potassium tetrafluoroaluminate;

from about 2 to about 13 weight percent silicon;

from about 0.5 to about 3 weight percent of a metal selected from the group of metals whose electrode potential is less than the electrode potential of the aluminum alloy;

from about 0.1 to about 2 weight percent of a hydroxypropyl cellulose binder; and the balance being aluminum.

5. A method as recited in claim 1 wherein the flat stock is provided to have a thickness of less than about 0.3175 millimeter.

6. A method as recited in claim 1 further comprising the steps of:

inserting the tube into an aperture formed in an aluminum alloy member prior to the depositing and heating steps; and depositing the flux-brazing composition on an outer surface of the tube, such that the heating step causes the tube to be brazed to the aluminum alloy member.

7. A method as recited in claim 6 further comprising the step of forming a second tube from the unclad aluminum alloy flat stock so as to have a longitudinally-oriented lockseam, wherein the inserting step comprises inserting the second tube into a corresponding aperture in the aluminum alloy member, the tube and the second tube being oriented such that their corresponding lockseams are oriented to face one direction.

8. A method for manufacturing an aluminum alloy heat exchanger tube, the method comprising the steps of:

providing an aluminum alloy flat stock having oppositely disposed longitudinal edges;

depositing a flux-containing composition on opposite surfaces of the flat stock along one of the longitudinal edges;

drying the flux-containing composition;

rolling the flat stock so as to form a flat-type tube having a longitudinally-oriented lockseam formed by the longitudinal edges of the flat stock, the lockseam comprising overlapping portions of the flat stock, the flux-containing composition being disposed between the overlapping portions; and heating the tube for a duration that is sufficient to melt the flux-containing composition and thereby braze the lockseam to form a leak-proof seal.

9. A method as recited in claim 8 wherein the rolling step causes the tube to have a first cross-sectional diameter that is less than and transverse to a second cross-sectional diameter, and wherein the lockseam is formed at a side of the tube corresponding to the first cross-sectional diameter.

10. A method as recited in claim 8 wherein the flat stock is unclad and the flux-containing composition comprises a flux material, an aluminum-silicon powder and a binder.

11. A method as recited in claim 10 wherein the flux-containing composition consists essentially of:

from about 10 to about 50 weight percent of potassium tetrafluoroaluminate;

from about 2 to about 13 weight percent silicon; from about 0.5 to about 3 weight percent of a metal selected from the group of metals whose electrode potential is less than the electrode potential of the aluminum alloy;

from about 0.1 to about 2 weight percent of a hydroxypropyl cellulose binder; and the balance being aluminum.

12. A method as recited in claim 8 wherein the flat stock is clad with a cladding alloy and the flux-containing composition is essentially metal-free.

13. A method as recited in claim 12 wherein the rolling step causes the lockseam to form a clearance of up to about 250 micrometers between the overlapping portions, and wherein the heating step causes the flux-containing composition to melt such that capillary action draws the flux-containing composition from the clearance and displaces oxides present on surfaces of the overlapping portions, and further causes the cladding alloy to melt and fill the clearance.

14. A method as recited in claim 8 wherein the flat stock is provided to have a thickness of less than about 0.3175 millimeter.

15. A method as recited in claim 8 further comprising the steps of:

depositing the flux-containing composition on an outer surface of the tube; and inserting the tube into an aperture formed in an aluminum alloy member prior to the heating step, such that the heating step causes the tube to be brazed to the aluminum alloy member.

16. A method as recited in claim 15 further comprising the step of forming a second tube from the aluminum alloy flat stock so as to have a longitudinally-oriented lockseam, wherein the inserting step comprises inserting the second tube into a corresponding aperture in the aluminum alloy member, the tube and the second tube being oriented such that their corresponding lockseams are oriented to face one direction.

* * * * *

UNITED STATES PATENT AND TRADEMARK OFFICE
CERTIFICATE OF CORRECTION

PATENT NO.   : 5,692,300
DATED        : Dec. 2, 1997
INVENTOR(S)  : Conn et al.

It is certified that error appears in the above-indentified patent and that said Letters Patent is hereby corrected as shown below:

Assignee:
Title page, item [73], line 2, after "N.Y.", insert --, Paul Joseph Conn, Grand Island, N.Y., and Gary Asel Halstead, Lockport, N.Y. --

Column 1, line 37, delete "robe" and substitute therefor -- tube --.

Column 1, line 51, delete "robe" and substitute therefor -- tube --.

Column 6, line 7, delete "0.125" and substitute therefor -- 0.0125 --.

Signed and Sealed this

Seventh Day of April, 1998

Attest:

*Attesting Officer*

BRUCE LEHMAN

*Commissioner of Patents and Trademarks*